(12) United States Patent
Lim et al.

(10) Patent No.: US 10,624,038 B2
(45) Date of Patent: Apr. 14, 2020

(54) METHOD FOR DETERMINING TRANSMISSION POWER AND A MOBILE COMMUNICATION DEVICE PERFORMING THE METHOD

(71) Applicant: LG ELECTRONICS INC., Seoul (KR)

(72) Inventors: Suhwan Lim, Seoul (KR); Sangwook Lee, Seoul (KR); Joohee Lee, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/408,361

(22) Filed: May 9, 2019

(65) Prior Publication Data

US 2019/0349863 A1 Nov. 14, 2019

(30) Foreign Application Priority Data

May 14, 2018 (KR) .......................... 10-2018-0054659

(51) Int. Cl.
*H04B 7/0426* (2017.01)
*H04W 52/14* (2009.01)
*H04W 52/42* (2009.01)
*H04W 52/36* (2009.01)

(52) U.S. Cl.
CPC ....... *H04W 52/146* (2013.01); *H04W 52/367* (2013.01); *H04W 52/42* (2013.01)

(58) Field of Classification Search
CPC . H04W 52/146; H04W 52/283; H04W 52/34; H04W 72/1278; H04W 88/02; H04B 17/102; H04B 7/06; H04B 17/12; H04B 2001/0408; H04B 7/208; H01Q 9/285; H04L 5/0007; H04L 5/001; H04L 5/0005
USPC .......................................... 455/115.3, 127.4
See application file for complete search history.

(56) References Cited

U.S. PATENT DOCUMENTS

2019/0036578 A1* 1/2019 Zirwas ................. H04B 7/0465
2019/0222275 A1* 7/2019 Mo ...................... H04B 7/0482

* cited by examiner

*Primary Examiner* — Tu X Nguyen
(74) *Attorney, Agent, or Firm* — Lee, Hong, Degerman, Kang & Waimey

(57) ABSTRACT

There is provided a method for determining transmission power. The method is performed by a wireless communication device and comprises: determining transmission power; and transmitting uplink signal based on the transmission power, wherein the transmission power meets a requirement for a minimum EIRP value for the spherical coverage, and wherein the requirement for the minimum EIRP value for the spherical coverage is predetermined based on a 50th percentile of a distribution of measured power.

16 Claims, 25 Drawing Sheets

(a)

(b)

METHOD FOR DETERMINING TRANSMISSION POWER AND A MOBILE COMMUNICATION DEVICE PERFORMING THE METHOD

CROSS-REFERENCE TO RELATED APPLICATIONS

Pursuant to 35 U.S.C. § 119(a), this application claims the benefit of earlier filing date and right of priority to Korean Patent Application No. 10-2018-0054659, filed on May 14, 2018, the contents of which are all hereby incorporated by reference herein in their entirety.

BACKGROUND OF THE INVENTION

Field of the Invention

The present invention relates to mobile communication.

Discussion of the Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (D2D) communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

A user equipment (hereinafter, UE) for NR supports analog beamforming. The UE for NR determines transmission power based on a regulatory requirement for transmission power. Current regulatory requirements for transmission power, just restricted on the maximum allowed peak EIRP power on the best beam direction. As the UE transmits uplink signal based on the analog beamforming, a spherical coverage is needed to be considered for the requirement for the EIRP value. However, only peak EIRP (Equivalent Isotropically Radiated Power) value and maximum allowed transmission power are considered for the requirement for transmission power. Thus, it is needed to define an EIRP value for the spherical coverage such that the analog beamforming and a loss term to cover whole spherical ranges, such as actual display (for example, LCD) and external cover of a UE, are reflected to the requirement.

SUMMARY OF THE INVENTION

Accordingly, a disclosure of the present specification has been made in an effort to solve the aforementioned problem.

In accordance with an embodiment of the present invention, provided is a method for determining transmission power, the method performed by a wireless communication device and comprising: determining transmission power; and transmitting uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

Wherein the requirement for the minimum EIRP value for the spherical coverage is predetermined based on a minimum peak EIRP value and an offset related to the 50th percentile of the distribution of measured radiated power.

Wherein the requirement for the minimum EIRP value for the spherical coverage is predetermined based on subtracting the offset from the minimum peak EIRP value.

Wherein the requirement for the minimum EIRP value for the spherical coverage is equal to 6.6 dBm for an operating band 260.

Wherein the requirement for the minimum EIRP value for the spherical coverage is equal to 8.4 dBm for an operating band 257 or 258.

Wherein the offset is equal to 14 dB.

Wherein the transmission power is determined to have a EIRP value which is bigger than or equal to the minimum EIRP value.

In accordance with an embodiment of the present invention, provided is a wireless communication device for determining a transmission power, the wireless communication device comprising: a transceiver; a memory; and a processor operatively coupled to the transceiver and the memory, the processor is configured to: determine transmission power; and control the transceiver to transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

Wherein the requirement for the minimum EIRP value for the spherical coverage is predetermined based on a minimum peak EIRP value and an offset related to the 50th percentile of the distribution of measured radiated power.

Wherein the requirement for the minimum EIRP value for the spherical coverage is predetermined based on subtracting the offset from the minimum peak EIRP value.

Wherein the requirement for the minimum EIRP value for the spherical coverage is equal to 6.6 dBm for an operating band 260.

Wherein the requirement for the minimum EIRP value for the spherical coverage is equal to 8.4 dBm for an operating band 257 or 258.

Wherein the offset is equal to 14 dB.

Wherein the transmission power is determined to have a EIRP value which is bigger than or equal to the minimum EIRP value.

Wherein the wireless communication device performs communication with at least one of a mobile terminal, a network and an autonomous vehicle, which is different from the wireless communication device.

In accordance with an embodiment of the present invention, provided is a processor for a wireless communication device in a wireless communication system, wherein the processor is configured to control the wireless device to: determine transmission power; and transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

According to a disclosure of the present invention, the above problem of the related art is solved.

DETAILED DESCRIPTION OF THE EMBODIMENTS

Figure 1:
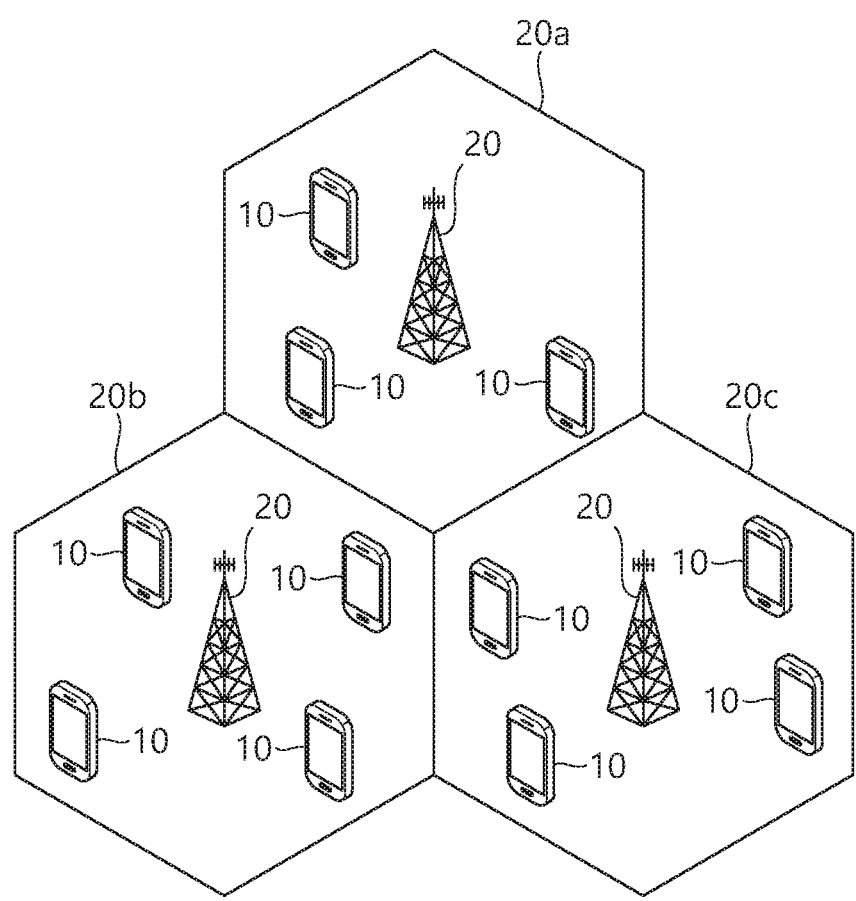
FIG. 1 illustrates a wireless communication system.

Hereinafter, based on 3rd Generation Partnership Project (3GPP) long term evolution (LTE), 3GPP LTE-advanced (LTE-A), 3GPP 5G ($5^{th}$ generation) or 3GPP New Radio (NR), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
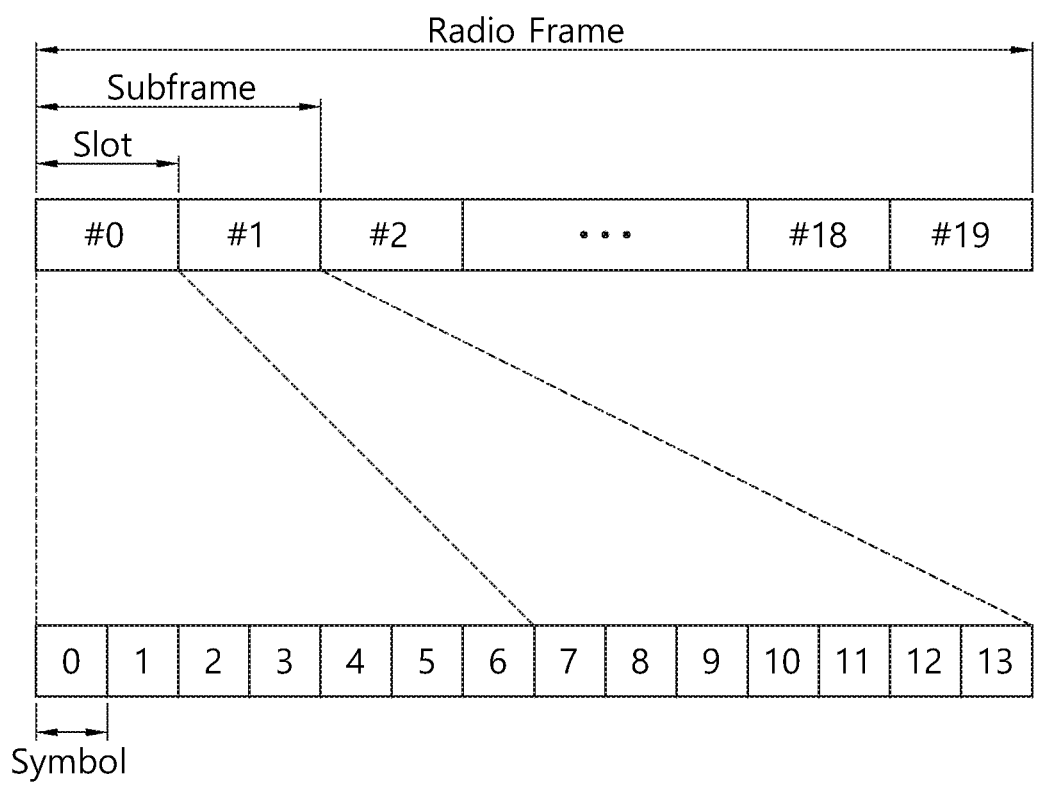
FIG. 2 illustrates the architecture of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
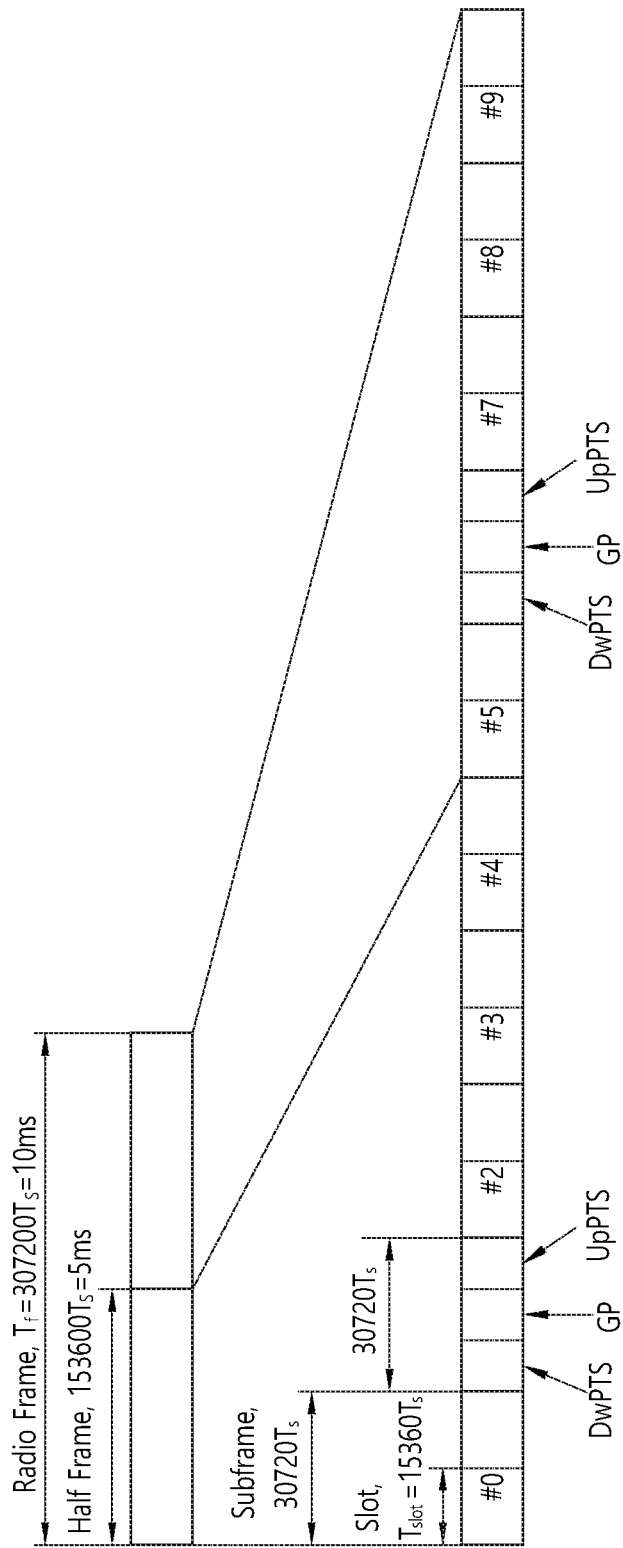
FIG. 3 illustrates the architecture of a downlink radio frame according to TDD in 3GPP LTE.

FIG. 3 illustrates the architecture of a downlink radio frame according to TDD in 3GPP LTE.

Sub-frames having index #1 and index #6 are denoted special sub-frames, and include a DwPTS(Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Figure 4:
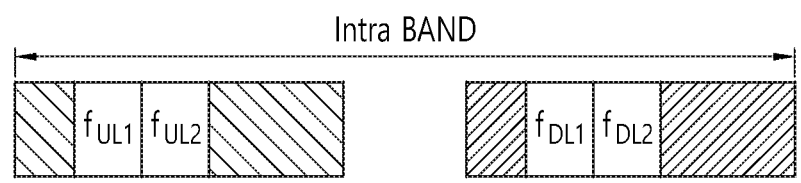
FIG. 4 is a concept view illustrating intra-band carrier aggregation (CA).
Figure 4:
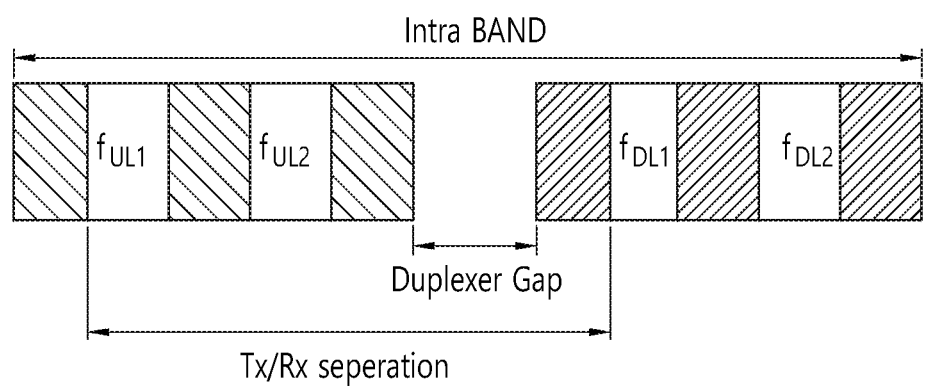

FIG. 4 is a concept view illustrating intra-band carrier aggregation (CA).

FIG. 4(a) illustrates intra-band contiguous CA, and FIG. 4(b) illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 4(a) and the intra-band non-contiguous CA shown in FIG. 4(b).

Figure 5:
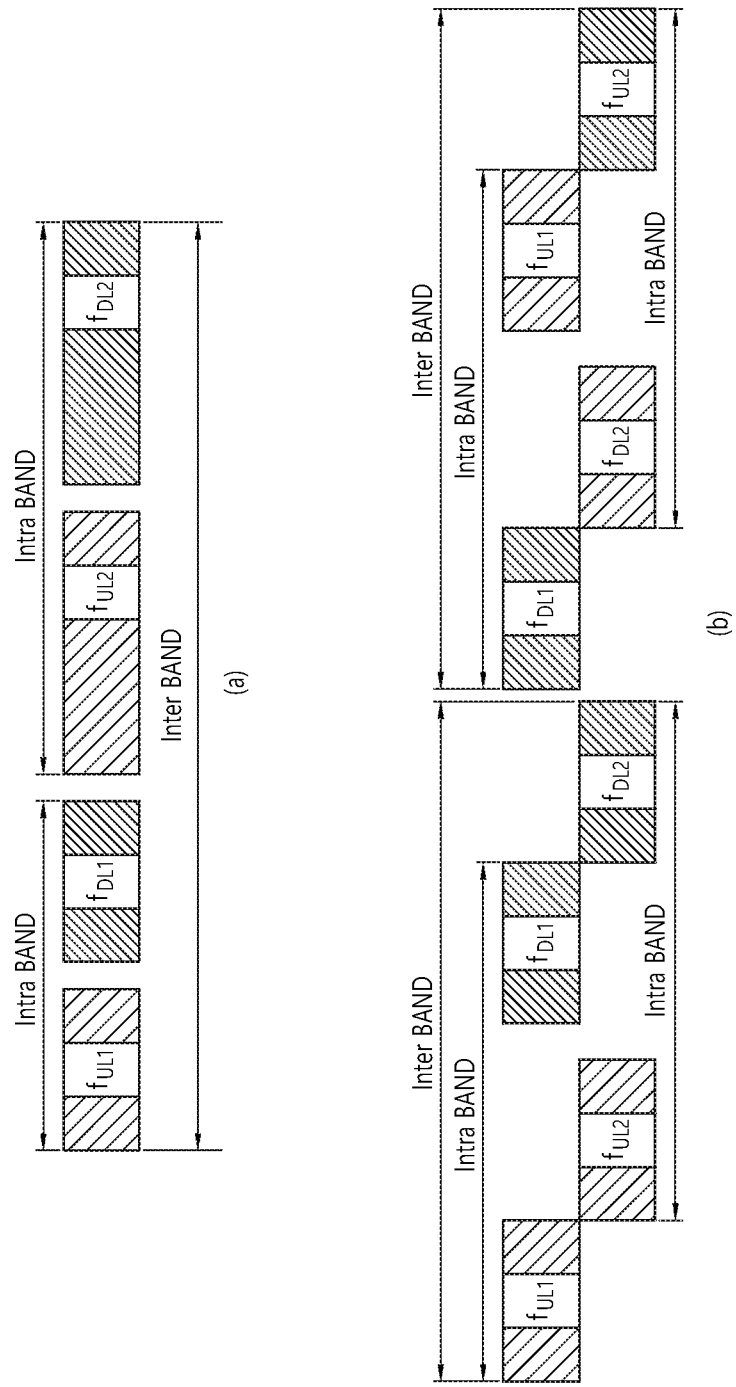
FIG. 5 is a concept view illustrating inter-band carrier aggregation.

FIG. 5 is a concept view illustrating inter-band carrier aggregation.

FIG. 5(a) illustrates a combination of a lower band and a higher band for inter-band CA, and FIG. 5(b) illustrates a combination of similar frequency bands for inter-band CA.

In other words, the inter-band carrier aggregation may be separated into inter-band CA between carriers of a low band and a high band having different RF characteristics of inter-band CA as shown in FIG. 5(a) and inter-band CA of similar frequencies that may use a common RF terminal per component carrier due to similar RF (radio frequency) characteristics as shown in FIG. 5(b).

TABLE 2

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |

TABLE 2-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Meanwhile, the 3GPP LTE/LTE-A systems define operating bands for uplink and downlink as shown in Table 2 above. Four CA cases shown in FIG. 5 come from Table 2.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 2, each nation's frequency distributing organization may assign specific frequencies to service providers in compliance with the nation's circumstances.

Meanwhile, CA bandwidth classes and their corresponding guard bands are as shown in the following table.

TABLE 3

| CA Bandwidth Class | Aggregated Transmission Bandwidth Configuration | Maximum number of CCs | Nominal Guard Band BWGB |
|---|---|---|---|
| A | $N_{RB,agg}$ ≤ 100 | 1 | $0.05BW_{Channel(1)}$ |
| B | $N_{RB,agg}$ ≤ 100 | 2 | FFS |
| C | 100 < $N_{RB,agg}$ ≤ 200 | 2 | 0.05 max($BW_{Channel(1)}$, $BW_{Channel(2)}$) |
| D | 200 < $N_{RB,agg}$ ≤ [300] | FFS | FFS |
| E | [300] < $N_{RB,agg}$ ≤ [400] | FFS | FFS |
| F | [400] < $N_{RB,agg}$ ≤ [500] | FFS | FFS |

In the above table, the brackets [ ] represent that the value therebetween is not completely determined and may be varied. FFS stands for 'For Further Study.' $N_{RB\_agg}$ is the number of RBs aggregated in an aggregation channel band.

Table 4 below shows bandwidth sets respective corresponding to CA configurations.

TABLE 4

E-UTRA CA configuration/Bandwidth combination set

| E-UTRA CA configuration | 50RB + 100RB (10 MHz + 20 MHz) | 75RB + 75RB (15 MHz + 15 MHz) | 75RB + 100RB (15 MHz + 20 MHz) | 100RB + 100RB (20 MHz + 20 MHz) | Maximum aggregated bandwidth [MHz] | Bandwidth Combination Set |
|---|---|---|---|---|---|---|
| CA_1C  |     | Yes |     | Yes | 40 | 0 |
| CA_7C  |     | Yes |     | Yes | 40 | 0 |
| CA-38C |     | Yes |     | Yes | 40 | 0 |
| CA_40C | Yes | Yes |     | Yes | 40 | 0 |
| CA_41C | Yes | Yes | Yes | Yes | 40 | 0 |

In the above table, CA configuration represents an operating bandwidth and CA bandwidth class. For example, CA_1C means operating band 2 in Table 2 and CA band class C in Table 3. All of the CA operating classes may apply to bands that are not shown in the above table.

<Internet of Things (IoT) Communication>

Meanwhile, hereinafter, IoT will be described.

IoT refers to information exchange through the base station between IoT devices without accompanying human interaction and information exchange through the base station between an IoT device and a server. As such, IoT communication communicates via cellular base stations and thus is also referred to as cellular Internet of Things (CIoT).

Such IoT communication is a type of machine type communication (MTC). Therefore, the IoT device may be referred to as an MTC device.

Since the IoT communication has features that a transmission data amount is small and uplink or downlink data transmission and reception rarely occur, it is preferable to lower the cost of the IoT device and reduce battery consumption in accordance with a low data transmission rate. In addition, since the IoT device has a feature of low mobility, the channel environment is not almost changed.

As one method for low-cost IoT devices, regardless of a system bandwidth of the cell, the IoT device may use a sub-band of, for example, approximately 1.4 MHz.

IoT communication operating on such a reduced bandwidth may be called narrow band (NB) IoT communication or NB CIoT communication.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile BroadBand (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 6:
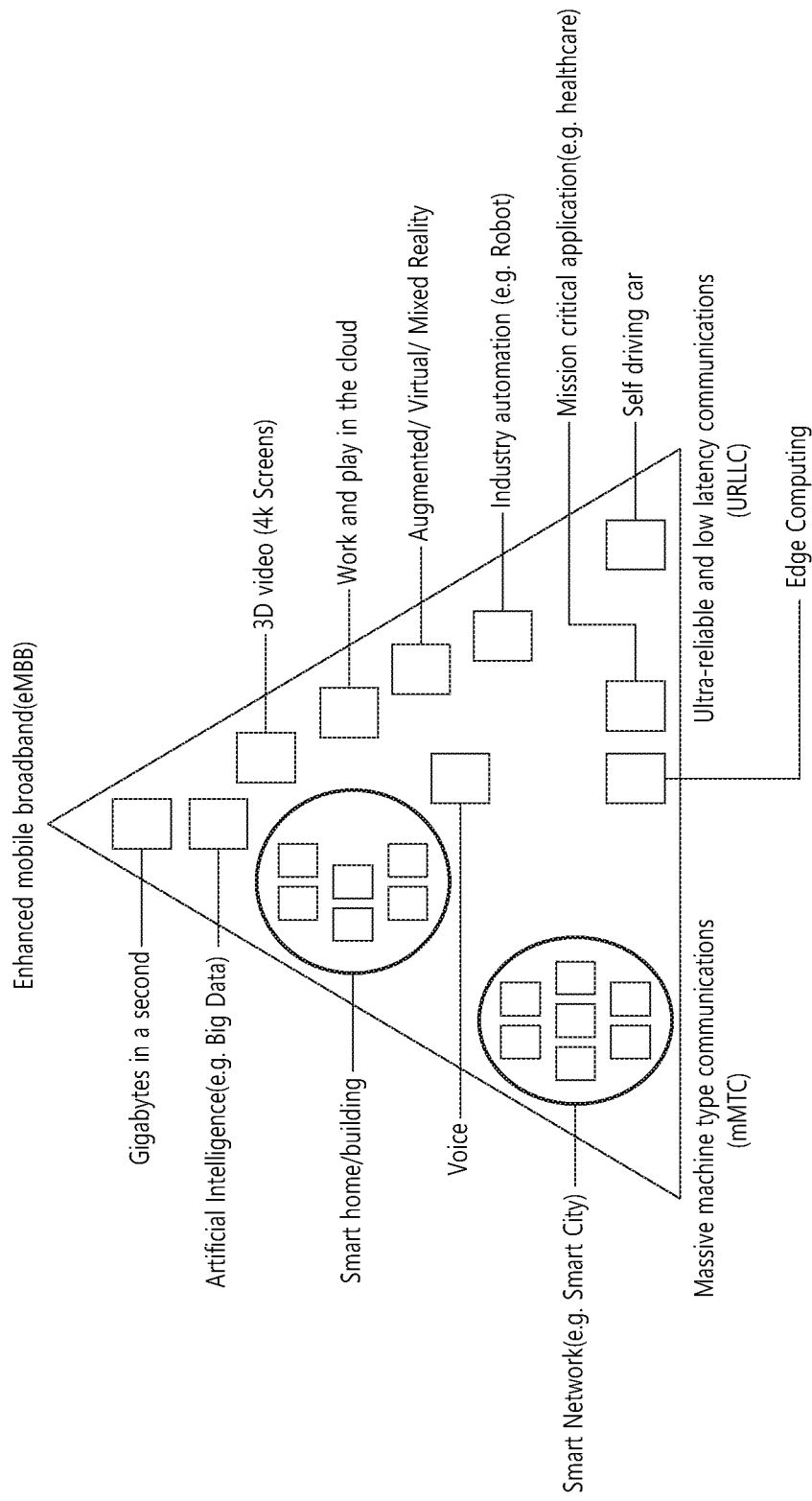
FIG. 6 illustrates examples of 5G usage scenarios to which the technical features of the present invention can be applied.

FIG. 6 illustrates examples of 5G usage scenarios to which the technical features of the present invention can be applied.

The 5G usage scenarios shown in FIG. 6 are only exemplary, and the technical features of the present invention can be applied to other 5G usage scenarios which are not shown in FIG. 6.

Referring to FIG. 6, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 6 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 7A:
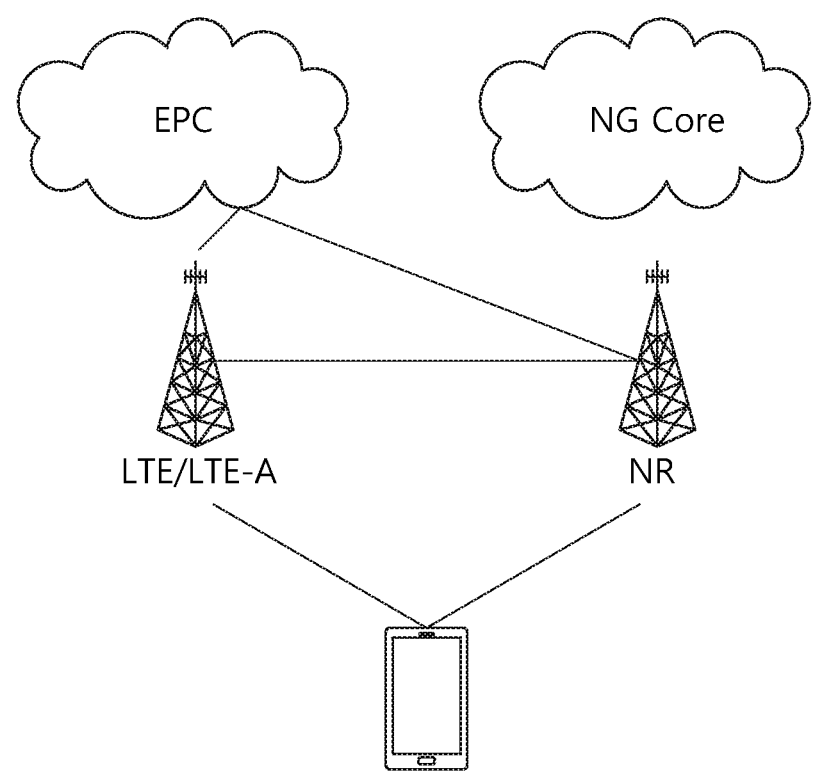
FIGS. 7A to 7C are exemplary diagrams illustrating an exemplary architecture for a service for next-generation mobile communication.
Figure 7B:
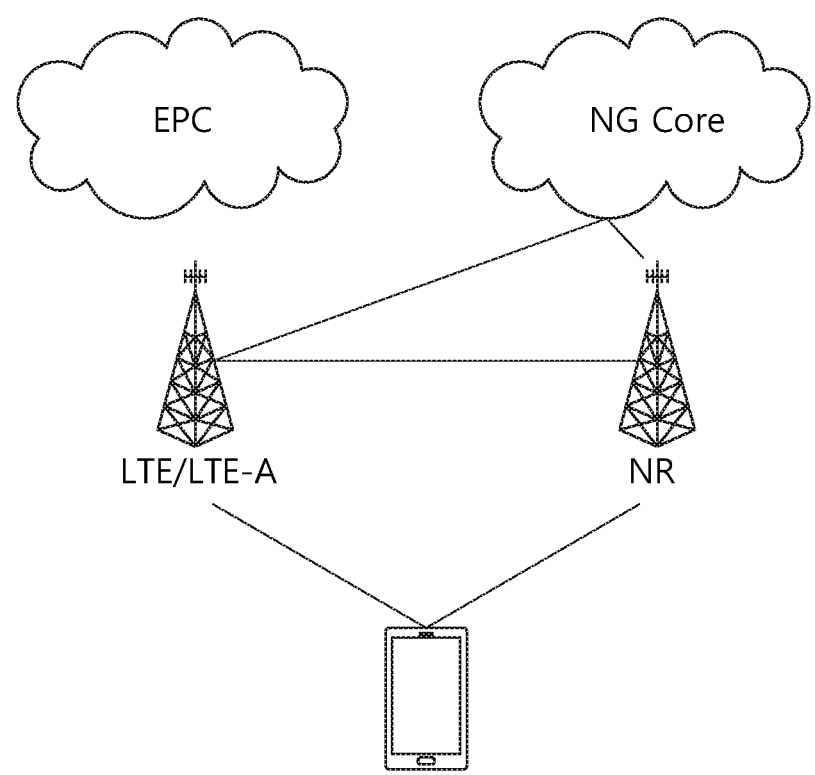
Figure 7C:
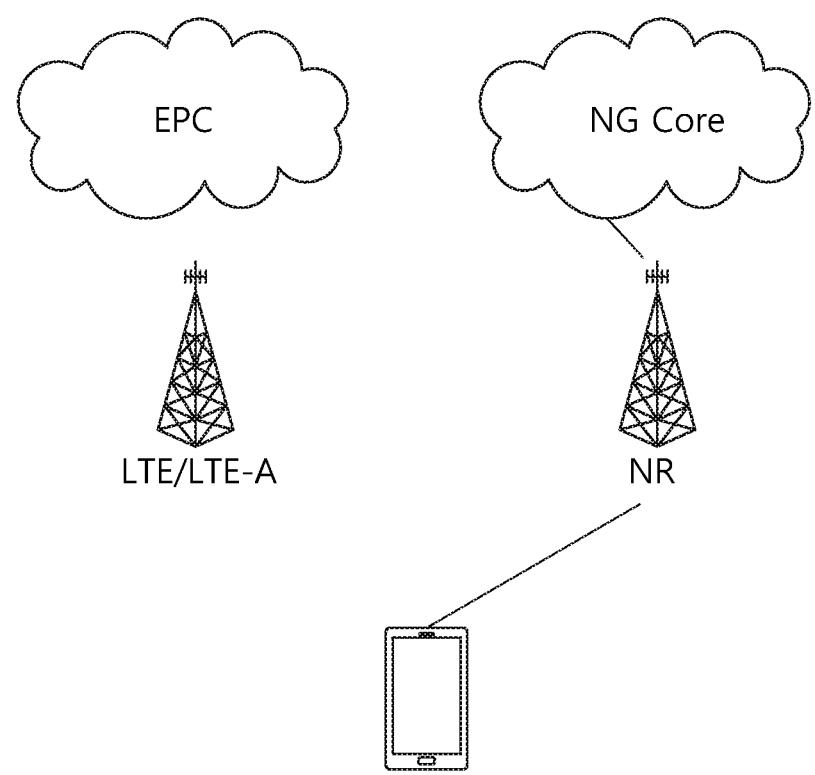

FIGS. 7A to 7C are exemplary diagrams illustrating exemplary architectures for services of the next generation mobile communication.

Referring to FIG. 7A, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 7B, unlike FIG. 4a, the LTE/LTE-A based cell is connected to a core network for the 5G mobile communication, that is, a next generation (NG) core network.

The service scheme based on the architecture as illustrated in FIGS. 4A and 4B is called non-standalone (NSA).

Referring to FIG. 7C, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 8:
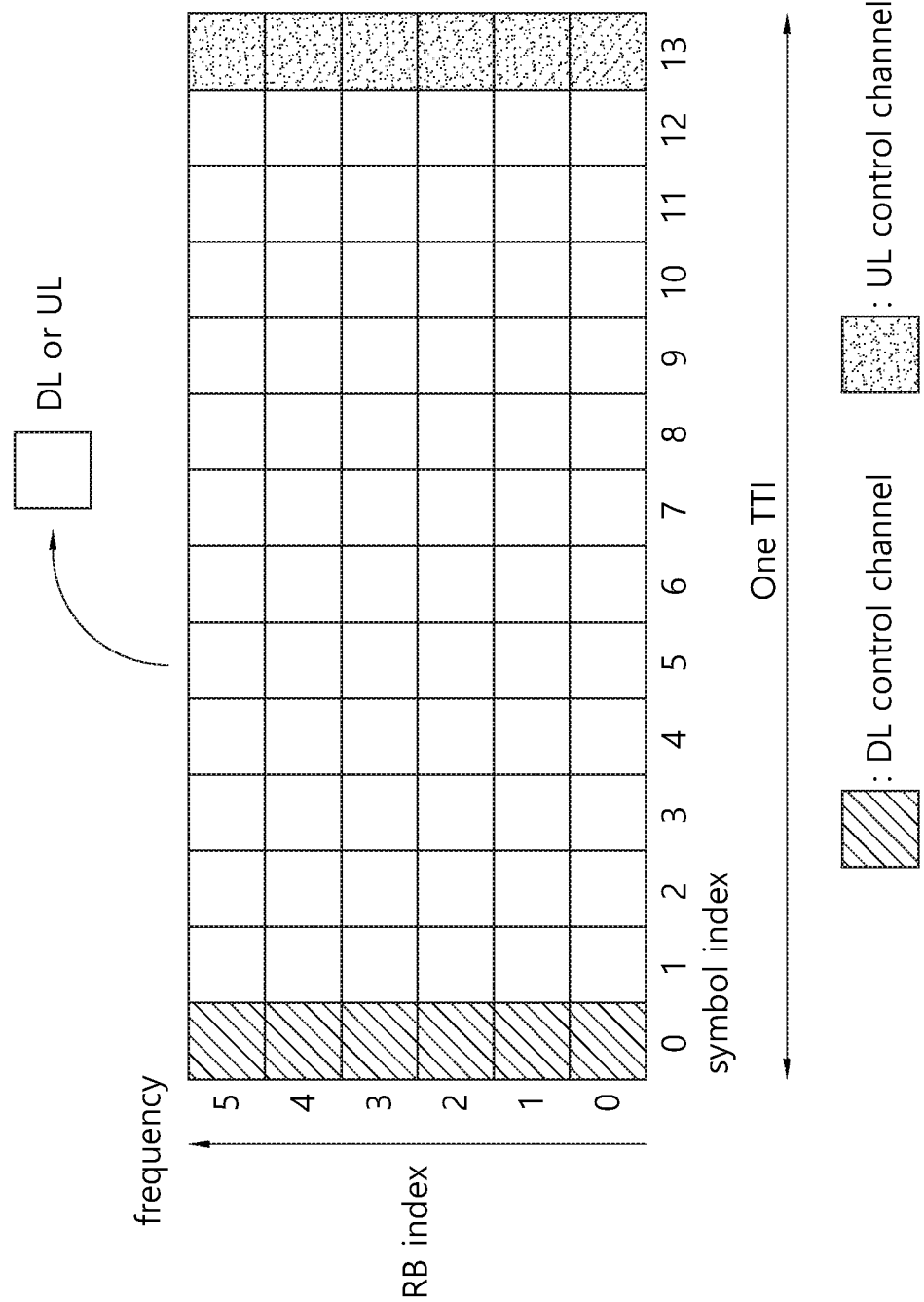
FIG. 8 illustrates an example of a subframe type in NR.

FIG. 8 illustrates an example of a subframe type in NR.

A transmission time interval (TTI) shown in FIG. 8 may be referred to as a subframe or slot for NR (or new RAT). The subframe (or slot) of FIG. 8 may be used in a TDD system of NR (or new RAT) to minimize the data transmission delay. As illustrated in FIG. 8, a subframe (or slot) includes 14 symbols, like the current subframe. The front symbol of the subframe (or slot) may be used for a DL control channel, and the rear symbol of the subframe (or slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received within a subframe (or slot), and an uplink acknowledgment response (ACK/NACK) may be transmitted within the subframe (or slot). The structure of such a subframe (or slot) may be referred to as a self-contained subframe (or slot). The use of such a sub-frame (or slot) structure has an advantage that the time taken to retransmit the data where a receive error occurs is reduced and a latency time of the last data transmission may be minimized. In such a self-contained subframe (or slot) structure, a time gap may be required in a transition process from the transmission mode to the reception mode or from the reception mode to the transmission mode. To this end, some OFDM symbols at the time of switching from DL to UL in the subframe structure may be configured as a guard period (GP).

<Support of Various Numerologies>

In the next system, a number of numerologies may be provided to the UE with the development of a wireless communication technology.

The numerology may be defined by a cycle prefix (CP) length and a subcarrier spacing. One cell may provide a plurality of numerologies to the UE. When the index of the numerology is denoted by μeach subcarrier interval and corresponding CP length may be as shown in table below.

TABLE 5

| μ | $\Delta f = 2^\mu \cdot 15$ [kHz] | CP |
|---|---|---|
| 0 | 15 | Normal |
| 1 | 30 | Normal |
| 2 | 60 | Normal, extended |
| 3 | 120 | Normal |
| 4 | 240 | Normal |

In the case of a normal CP, when the index of the numerology is denoted by μ, the number Nslotsymb of OFDM symbols per slot, the number Nframe,μslot of slots per frame, and the number Nsubframe,μslot of slots per subframe are shown in Table below.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 6-continued

| μ | $N^{slot}_{symb}$ | $N^{frame,\mu}_{slot}$ | $N^{subframe,\mu}_{slot}$ |
|---|---|---|---|
| 3 | 14 | 80 | 8 |
| 4 | 14 | 160 | 16 |
| 5 | 14 | 320 | 32 |

In the case of an extended CP, when the index of the numerology is denoted by μ, the number Nslotsymb of OFDM symbols per slot, the number Nframe,μslot of slots per frame, and the number Nsubframe,μslot of slots per subframe are shown in Table below.

TABLE 7

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol in a symbol may be used as a downlink or as an uplink as shown in table below. In the following table, the uplink is denoted by U and the downlink is denoted by D. In Table below, X represents a symbol that may be used flexibly in the uplink or downlink.

TABLE 8

| Format | \multicolumn{14}{c}{Symbol number in slot} |
| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | X | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | X | U | U | U | D | X | U | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | U | U |
| 61 | D | X | X | X | X | U | D | D | X | X | X | X | X | U |

<Operating Band in NR>

Operating bands in NR are divided into FR 1 (Frequency Range 1) band and FR 2 band. FR 1 band includes a frequency band of 6 GHz or less, and FR 2 band includes a frequency band exceeding 6 GHz. FR 1 band and FR 2 band are shown in Table 9.

TABLE 9

| Frequency Range | Corresponding range of frequency |
|---|---|
| Frequency Range 1 (FR 1) | 450 MHz-6000 MHz |
| Frequency Range 2 (FR 2) | 24250 MHz-52600 MHz |

An operating band shown in Table 10 is a reframing operating band that is transitioned from an operating band of LTE/LTE-A. This operating band is referred to as FR1 band.

TABLE 10

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table shows an NR operating band defined on a high frequency. This operating band is referred to as FR2 band.

TABLE 11

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

On the other hand, when the operating band of the above table is used, the channel bandwidth is used as shown in Table below.

TABLE 12

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS means subcarrier spacing. In the above table, NRB represents the number of RBs.

On the other hand, when the operating band of the above table is used, the channel bandwidth is used as shown in Table below.

TABLE 13

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 9:
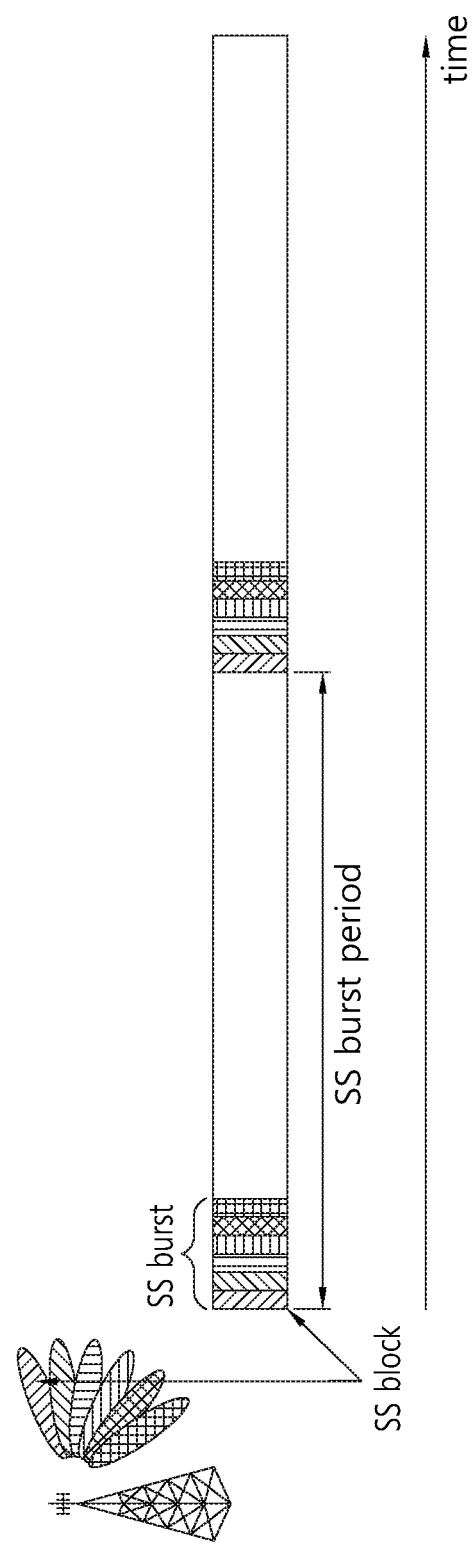
FIG. 9 is an exemplary diagram illustrating an example of an SS block in the NR.

FIG. 9 is an exemplary diagram illustrating an example of an SS block in NR.

Referring to FIG. 9, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 10.

Figure 10:
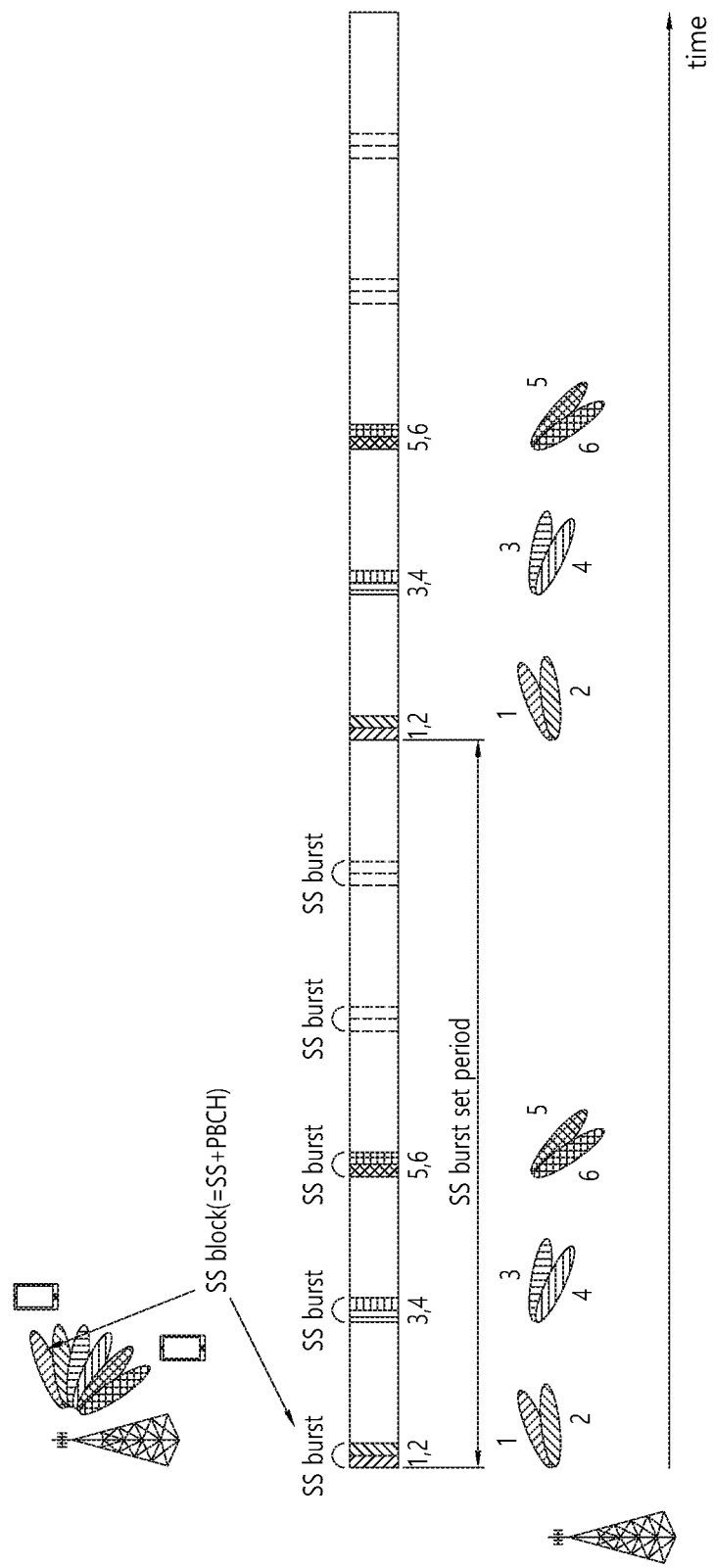
FIG. 10 is an exemplary diagram illustrating an example of beam sweeping in the NR.

FIG. 10 is an exemplary diagram illustrating an example of beam sweeping in NR.

The base station transmits each SS block in the SS burst with beam sweeping over time. At this time, the SS blocks in the SS burst set are transmitted in order to support UEs existing in different directions. In FIG. 10, the SS burst set includes SS blocks 1 to 6, and each SS burst includes two SS blocks.

<Channel Raster and Sync Raster>

Hereinafter, a channel raster and a sync raster will be described.

A frequency channel raster is defined as a set of RF reference frequencies (FREF). The RF reference frequency may be used as a signal for indicating the position of an RF channel, an SS block, and the like.

The global frequency raster is defined for all frequencies of 0 to 100 GHz. The unit of the global frequency raster is denoted by ΔFGlobal.

The RF reference frequency is specified by an NR absolute radio frequency channel number (NR-ARFCN) in the range of the global frequency raster (0 . . . 2016666). The relationship between the NR-ARFCN and the RF reference frequency FREF of MHz may be expressed by the following Equation. Here, FREF-Offs and NRef-Offs are shown in the following Table.

$$F_{REF}=F_{REF\text{-}OFFS}+\Delta F_{Global}(N_{REF}-N_{REF\text{-}OFFS})$$

TABLE 14

| Frequency range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster represents a subset of RF reference frequencies that may be used to identify RF channel locations in the uplink and downlink. The RF reference frequency for the RF channel may be mapped to a resource element on the carrier.

The mapping between the RF reference frequency of the channel raster and the corresponding resource element may be used to identify an RF channel location. The mapping depends on the total number of RBs allocated to the channel and is applies to both UL and DL.

In the case of $N_{RB}$ mod 2=0, an RE index k is 0, and the PRB number is as follows.

$$n_{PRB} = \left\lfloor \frac{N_{RB}}{2} \right\rfloor$$

In the case of N mod 2=1, an RE index k is 6, and the PRB number is as follows.

$$n_{PRB} = \left\lfloor \frac{N_{RB}}{2} \right\rfloor$$

The RF channel location of the channel raster on each NR operating band may be represented as shown in the following Table.

TABLE 15

| NR operating band | $\Delta F_{Raster}$ (kHz) | Uplink frequency range of $N_{REF}$ (First-<Step size>-Last) | Downlink frequency range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 16

| NR operating band | $\Delta F_{Raster}$ (kHz) | Uplink and downlink frequency range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

On the other hand, the sync raster represents the frequency location of the SS block used to obtain system information by the UE. The frequency location of the SS block may be defined as SSREF using the corresponding GSCN number.

The present invention relates to a test method for UE RF related requirements to identify whether reciprocity of the Tx beam and Rx beam of NR UE are established.

In mmWave, basically, it can be divided into the case where the reciprocity of the beam is satisfied and the case where it is not.

Generally, at the mmWave frequency using TDD, if the Tx beam and the Rx beam use the same patch and same the same number of antennas, the direction of the Tx beam is determined based on the characteristic of the Rx beam. This is because it is assumed that there is a correspondence between the Tx beam and the Rx beam.

However, if the number of antenna is different or type of antenna is different, the above assumption is not made. Therefore, in this case, the tolerance of the beam direction according to the number of antennas should be considered.

Therefore, the present invention proposes a method for determining whether the terminal supports beam correspondence by simply testing the correspondence between the Tx beam and Rx beam.

Figure 11:
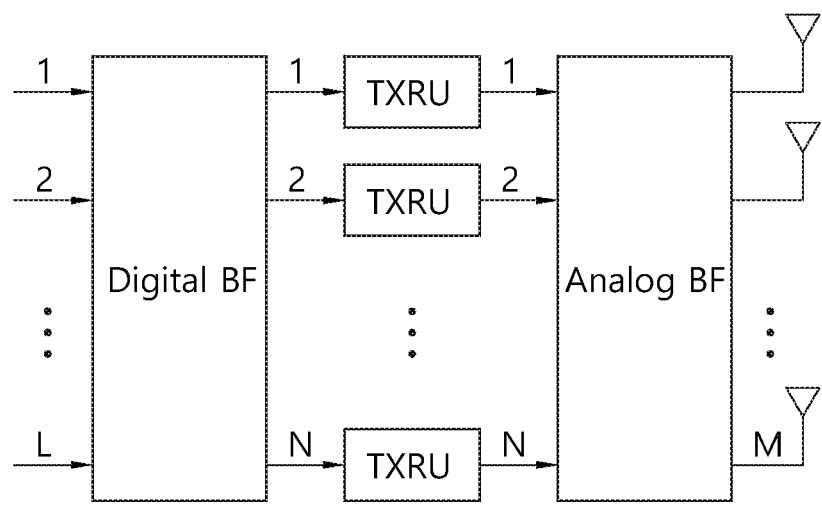
FIG. 11 illustrates an example of a schematic diagram of a hybrid beamforming structure.

FIG. 11 illustrates an example of a schematic diagram of a hybrid beamforming structure.

When multiple antennas are used in the New RAT system, a hybrid beamforming technique combining digital beamforming (digital BF) and analog beamforming (analog BF) is being emerged. In this case, analog beamforming (or RF beamforming) means an operation of performing precoding (or combining) in an RF stage. In the hybrid beamforming, the baseband stage and the RF stage perform precoding (or combining), respectively, thereby having an advantage of reducing the number of RF chains and the number of D/A (or A/D) converters, and being able to achieve performance close to digital beamforming. For convenience, the hybrid beamforming structure can be represented by N transceiver units (TXRU) and M physical antennas. The digital beamforming for the L data layers to be transmitted at a transmitting end can be represented by N by L matrices, and then the converted N digital signals are converted into analog signals through the TXRU and then an analog beamforming represented by M by N matrices, is applied.

The FIG. 11 is an abstract schematic diagram of the hybrid beamforming structure from the viewpoint of the TXRU and the physical antenna. In this case, the number of digital beams is L and the number of analog beams is N in FIG. 11. Furthermore, in the New RAT system, the base station is designed to change the analog beamforming in units of symbol, and thus it is considered to support more efficient beamforming to terminals located in a specific region. In addition, when defining specific N TXRUs and M RF antennas as one antenna panel in FIG. 11, a scheme of introducing a plurality of antenna panels to which independent hybrid beamforming is applicable is considered in the New RAT system.

Figure 12:
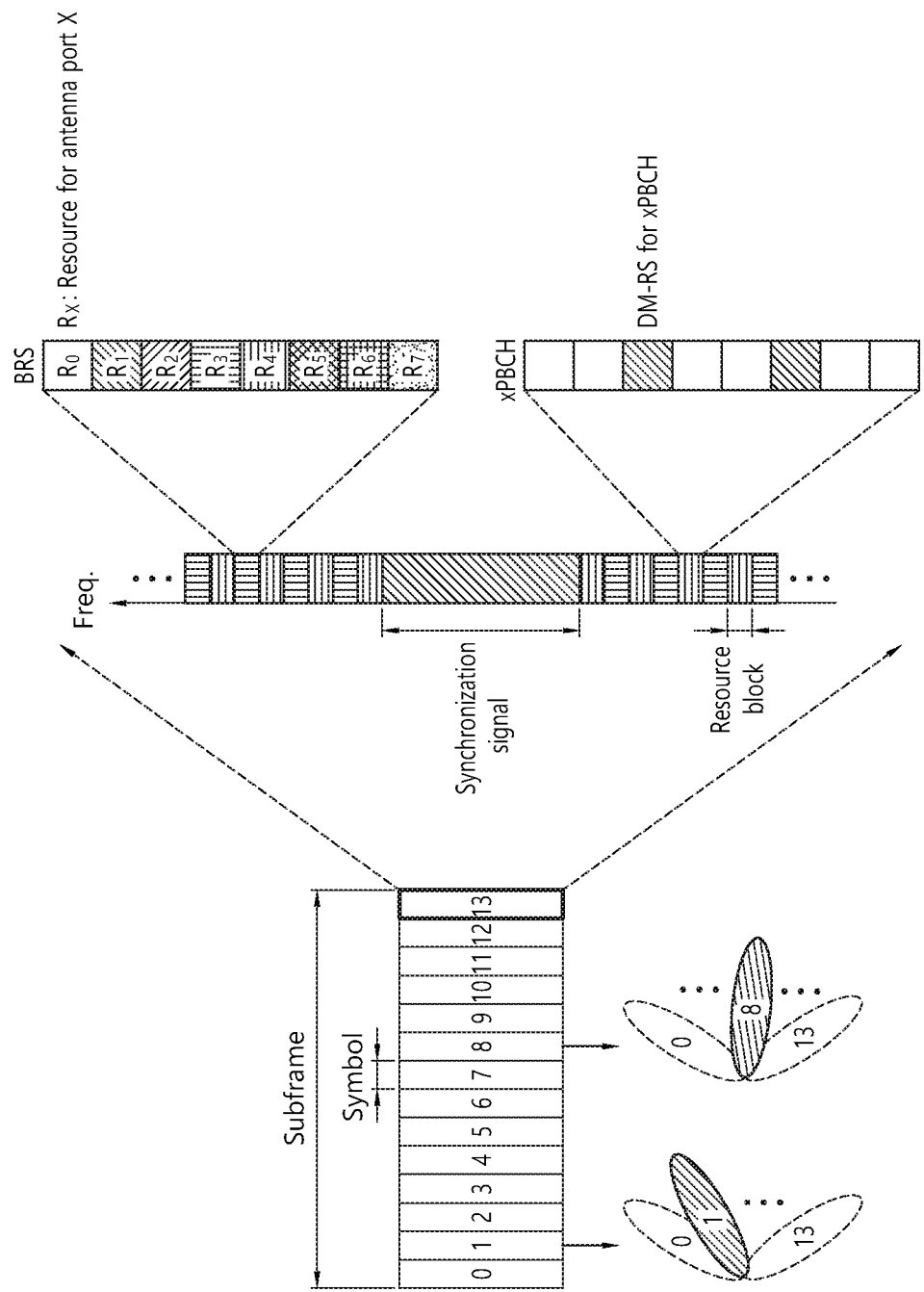
FIG. 12 illustrates an example of a diagram of a beam sweeping operation for synchronization signal and system information.

FIG. 12 illustrates an example of a diagram of a beam sweeping operation for synchronization signal and system information.

As described above, when a base station uses a plurality of analog beams, the analog beams advantageous for signal reception may be different from for each terminal, and thus sweeping operation, which at least a plurality of analog beams to be applied by a base station is changed for each symbol in a specific subframe (SF) for at least a synchronization signal, system information, a paging, and so on, thereby allowing all terminals to have a reception opportunity, is being considered. FIG. 12 below is a diagram of the beam sweeping operation for the synchronization signal and the system information in the downlink (DL) transmission process. In the FIG. 12 below, the physical resource (or physical channel) through which the system information of the New RAT system is transmitted in a broadcasting format is named as an xPBCH (physical broadcast channel). In this case, analog beams belonging to different antenna panels within one symbol can be simultaneously transmitted, and as shown in the FIG. 12 to measure channels for each analog beam, a beam RS (BRS) which is a reference signal (RS) in which a single analog beam (corresponding to a specific antenna panel) (BRS) is applied to be transmitted, is being discussed. The BRS may be defined for a plurality of antenna ports, and each antenna port of the BRS may correspond to a single analog beam. In this case, for the synchronization signal or the xPBCH unlike the BRS, all the analog beams in the analog beam group is applied to be transmitted so that an arbitrary terminal can receive the signals well.

DISCLOSURE OF THE PRESENT INVENTION

The present invention is related to analysis for reflecting a loss term, such as actual display (for example, LCD) and external cover of a UE, to a power class requirement for a spherical coverage of the UE. NR proto type UE in mmWave band is used for a measurement related to the present invention.

EIRP is the product of transmitter power and the antenna gain in a given direction relative to an isotropic antenna of a radio transmitter. In the present invention, the UE includes UEs of power class 1(Fixed wireless access (FWA) UE), power class 2 (vehicular UE), power class 3 (handheld UE) and power class 4 (high power non-handheld UE).

In RAN 4, only a value for minimum peak EIRP and a value for maximum allowed Tx power by regulation are defined. The peak EIRP is an EIRP measured in a specific direction which has a peak value with best beam direction. The below Table 17 and Table 18 are examples of requirements considering the peak EIRP and max allowed Tx power.

Table 17 is an example of a requirement for minimum peak EIRP for power class 3.

TABLE 17

| Operating band | Min peak EIRP (dBm) |
| --- | --- |
| n257 | 22.4 |
| n258 | 22.4 |
| n260 | 20.6 |
| n261 | 22.4 |

NOTE 1:
Minimum peak EIRP is defined as the lower limit without tolerance
NOTE 2:
Void Table 17 defines the maximum output power radiated by the UE for any transmission bandwidth within the channel bandwidth for non-CA configuration, unless otherwise stated. The period of measurement shall be at least one sub frame (1 ms). The requirement is verified with the test metric of total component of EIRP (Link=Beam peak search grids, Meas=Link angle). Link=Beam peak search grids means that the link set-up beam direction is found into the beam peak search grids and Meas=Link angle means that a measurement for minimum peak EIRP is performed based on the set up the link beam direction.

The requirement for the UE which supports a single FR2 band is specified in Table 17. For operating band n257 and n258, minimum peak EIRP value is 22.4 dBm. For operating band n260, minimum peak EIRP value is 20.6 dBm and for operating band n261, minimum peak EIRP value is 22.4 dBm. Transmission power for the UE needs to meet a requirement of the minimum peak EIRP. For example, peak EIRP of the UE needs to be equal to or bigger than the minimum peak EIRP value described in Table 17.

Table 18 is an example of a requirement for maximum output power limits for power class 3.

TABLE 18

| Operating band | Max TRP (dBm) | Max EIRP (dBm) |
| --- | --- | --- |
| n257 | 23 | 43 |
| n258 | 23 | 43 |
| n260 | 23 | 43 |
| n261 | 23 | 43 |

The requirements are verified with the test metrics of TRP (Total Radiated Power) (Link=TX beam peak direction) in beam locked mode and the total component of EIRP (Link=TX beam peak direction, Meas=Link angle). Max TRP value is 23 dBm for operating bands n257, n258, n260 and n261 and Max EIRP value is 43 dBm for operating bands n257, n258, n260 and n261.

There is no requirement for EIRP considering the spherical coverage before. For the spherical coverage, it is impossible to fully consider full sphere because the actual display and external cover of the UE interrupt transmission of signal. Thus, the minimum EIRP at the 50th percentile of the distribution of radiated power measured over the full sphere around the UE is defined as the spherical coverage requirement.

The percentile (or a centile) is a measure used in statistics indicating the value below which a given percentage of observations in a group of observations falls. For example, the 20th percentile is the value (or score) below which 20% of the observations may be found.

RAN4 agreed the UE minimum peak EIRP level and CDF (cumulative distribution function) test points at FR2 as below.

Agreement:
For Rel-15
  For 28 GHz
    MM peak EIRP is 22.4 dBm
    50%-tile requirement for EIRP CDF is FFS
  For 39 GHz
    MM peak EIRP is 20.6 dBm
    50%-tile requirement for EIRP CDF is FFS
Note: for 50%-tile, the values are FFS.

In the present invention, the measured EIRP levels of proto type NR UE for CDF based spherical coverage definitions at mmWave are provided.

Figure 13:
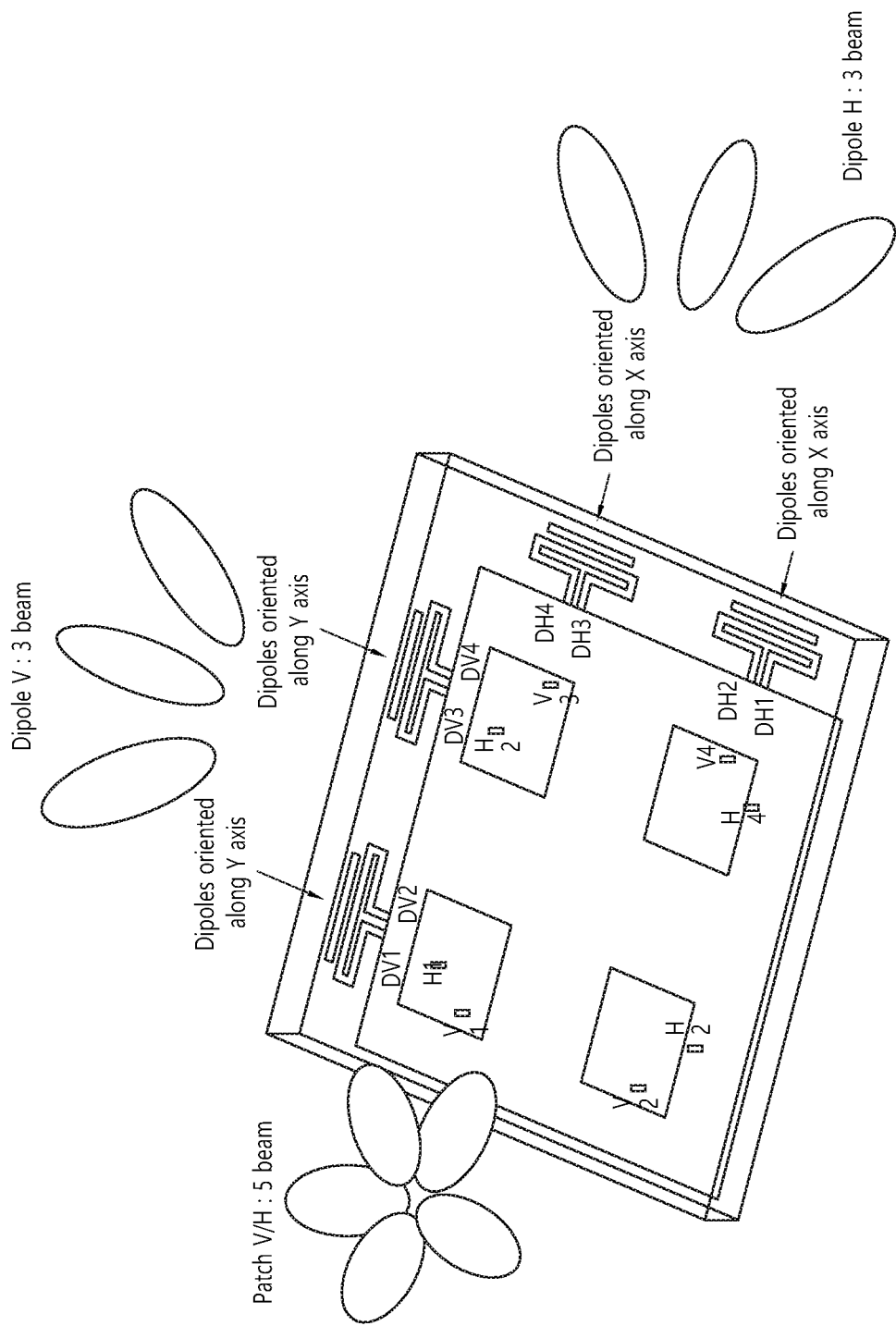
FIG. 13 illustrates an example of beams of dipole antenna and patch antenna of NR UE.

FIG. 13 illustrates an example of beams of dipole antenna and patch antenna of NR UE.

Based on Proto type NR UE for mmWave (for example, operating band n257), the EIPR level is measured based on two antenna type as shown in FIG. 13.
  1) Power of each Beam ID for Dipole antenna
  2) Power of each Beam ID for Patch antenna
  3) Combined Beam power for both Dipole and Patch antenna EIRP levels are measured based on antenna types described in FIG. 13. Dipole V: 3 beams means that 3 beams are generated from dipole antennas oriented along vertical axis (Y axis). Dipole H: 3 beam means that 3 beams are generated from dipole antennas oriented along horizontal axis (X axis). Patch V/H: 5 beams means that 5 beams are generated from patch antenna, which consists of 2×2 panel antennas (patch antennas) oriented along vertical axis and horizontal axis as an example beam configurations in FIG. 13. Both Dipole antenna (4 elements with V-pole (vertical-pole, DV 1 to DV 4) and H-pole (horizontal-pole, DH 1 to DH 4)) and Patch antennas (4 elements with V-pole (V 1 to V 4) and H-pole (H 1 to H 4)) are configured the analog beam pattern to cover the whole spherical coverage in mmWave.

In FIG. 13, the number of beam is composed with 6 beams according to each beam IDs for dipole antenna type and 5 beams according to each beam IDs for patch antenna type.

Figure 14:
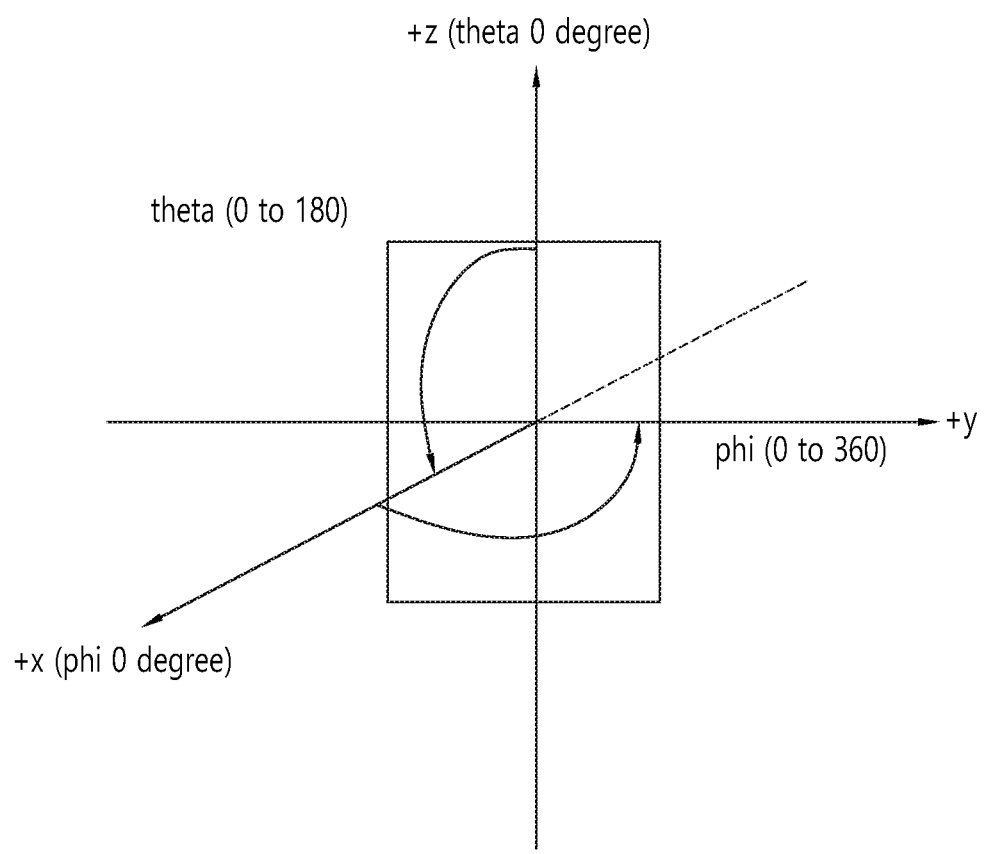
FIG. 14 illustrates an example of a test coordination grid in Anechoic Chamber for mmWave.

FIG. 14 illustrates an example of a test coordination grid in Anechoic Chamber for mmWave.

FIG. 14 show the NR UE test coordination grid with (theta, phi) in Anechoic Chamber for mmWave. In present invention, EIRP value is measured in Anechoic Chamber. The test density was compensated with equal density. If the test point is defined just vertical (θ) and horizontal (φ), then the test point is not constant and test density is not constant to verify the shole spherical coverage. So it is important to keep the constant density with adjusting the test point. Anechoic Chamber (an-echoic meaning "non-reflective, non-echoing, echo-free") is a room designed to completely absorb reflections of either sound or electromagnetic waves. They are also often isolated from waves entering from their surroundings. This combination means that a person or detector exclusively hears direct sounds (no reverberant sounds), in effect simulating being inside an infinitely large room.

Based on above test information, we measured the EIRP power level per antenna according to two antenna types in FIG. 13 and derived combined CDF EIRP curve as below FIG. 15 without a back cover of the UE.

FIG. 15A to FIG. 15D illustrates measured EIRP CDF curve.

Figure 15A:
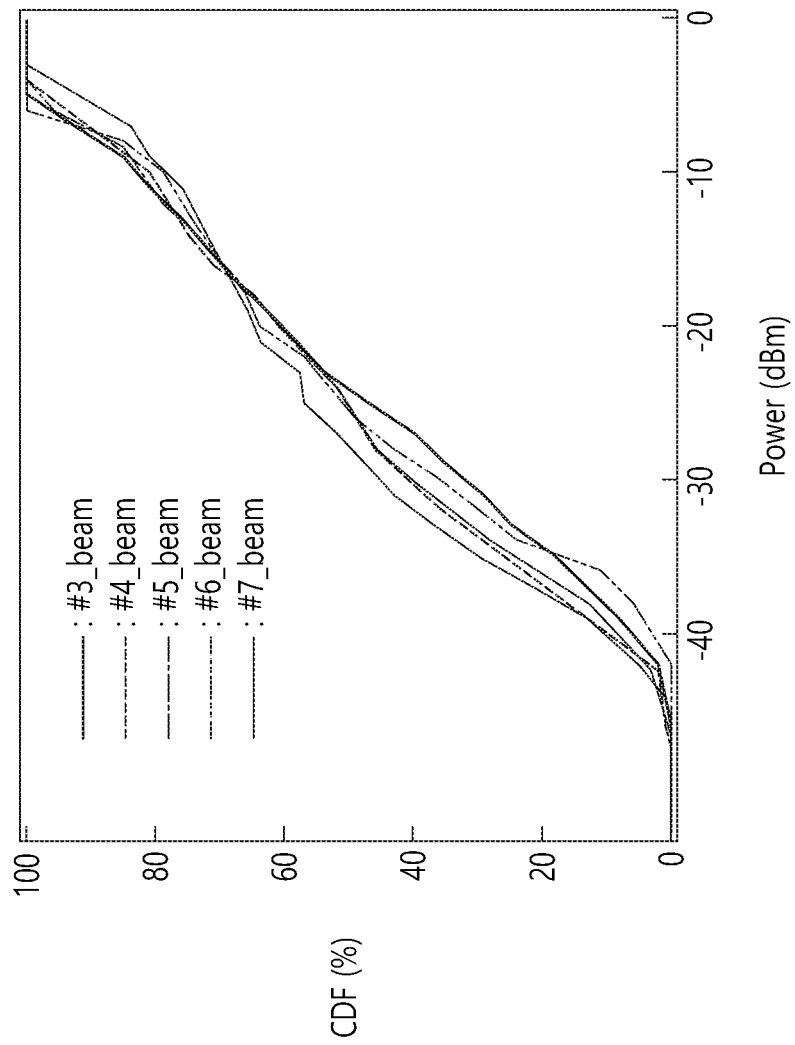
FIG. 15A to FIG. 15D illustrates measured EIRP CDF curve.
Figure 15B:
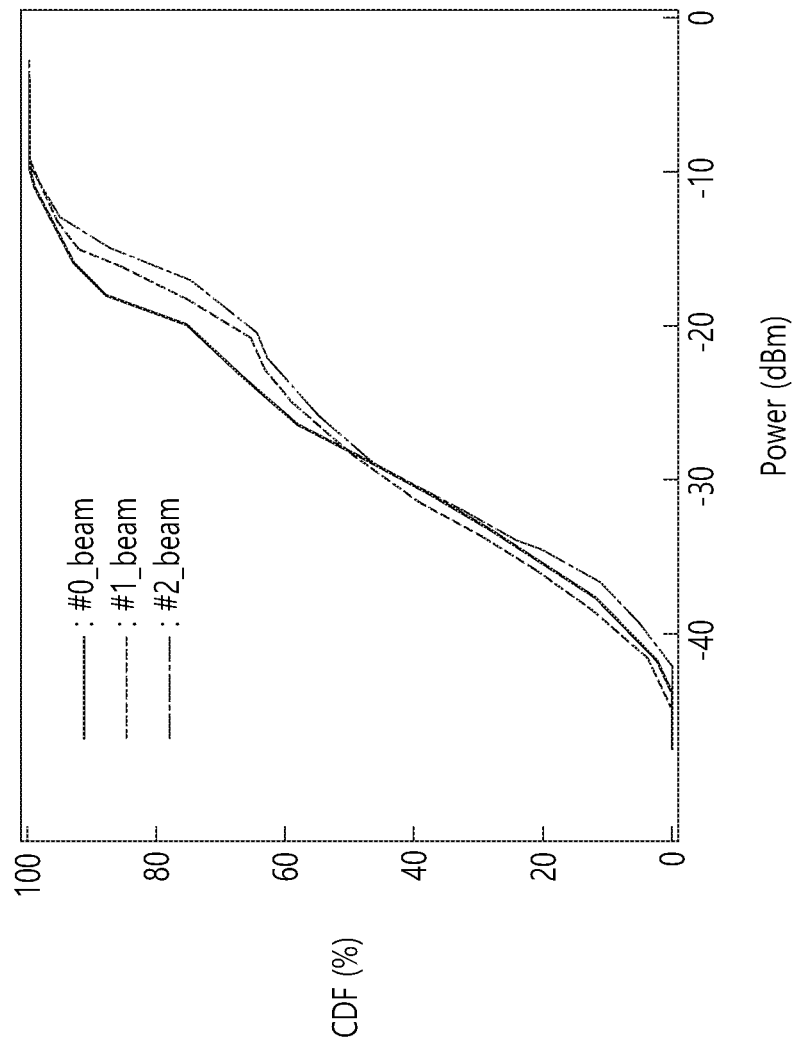
Figure 15C:
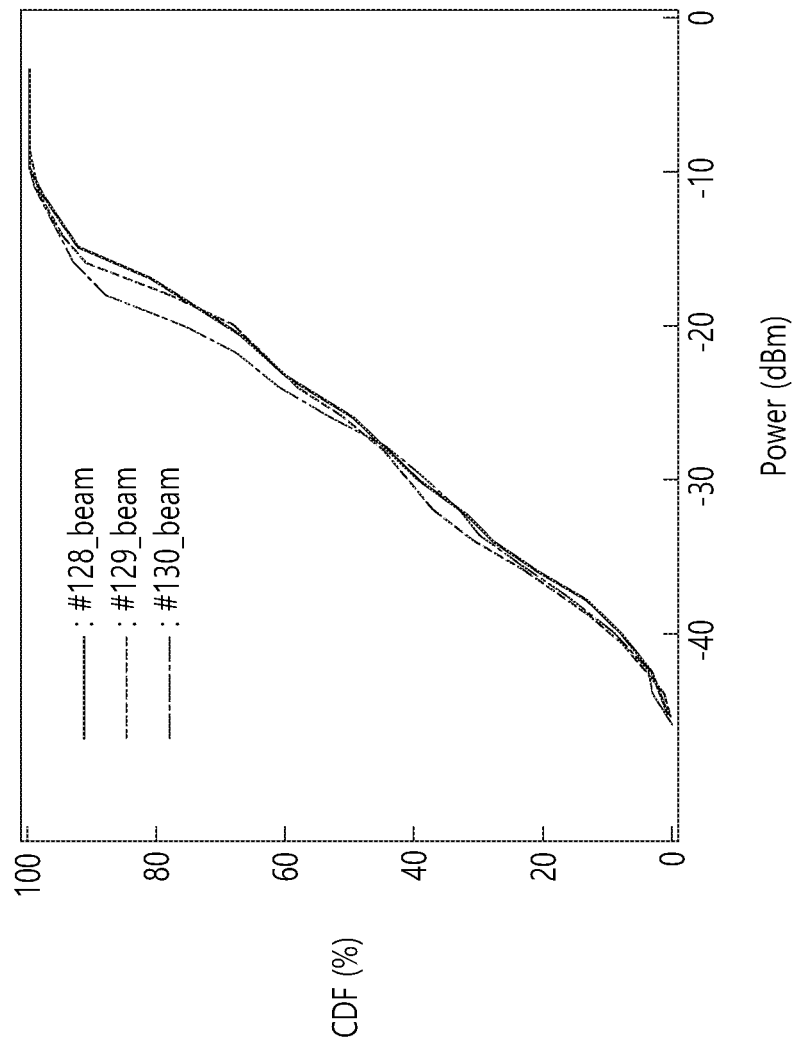

In FIG. 15A to FIG. 15D, show the example beam configurations according to both patch and dipole antennas. These beams #3 to #7 in FIG. 15A are beams generated from patch antenna. Beams #0 to #2 in FIG. 15B are beams generated from dipole antennas oriented along vertical axis. Beams #128 to #130 in FIG. 15C are beams generated from dipole antennas oriented along horizontal axis.

Figure 15D:
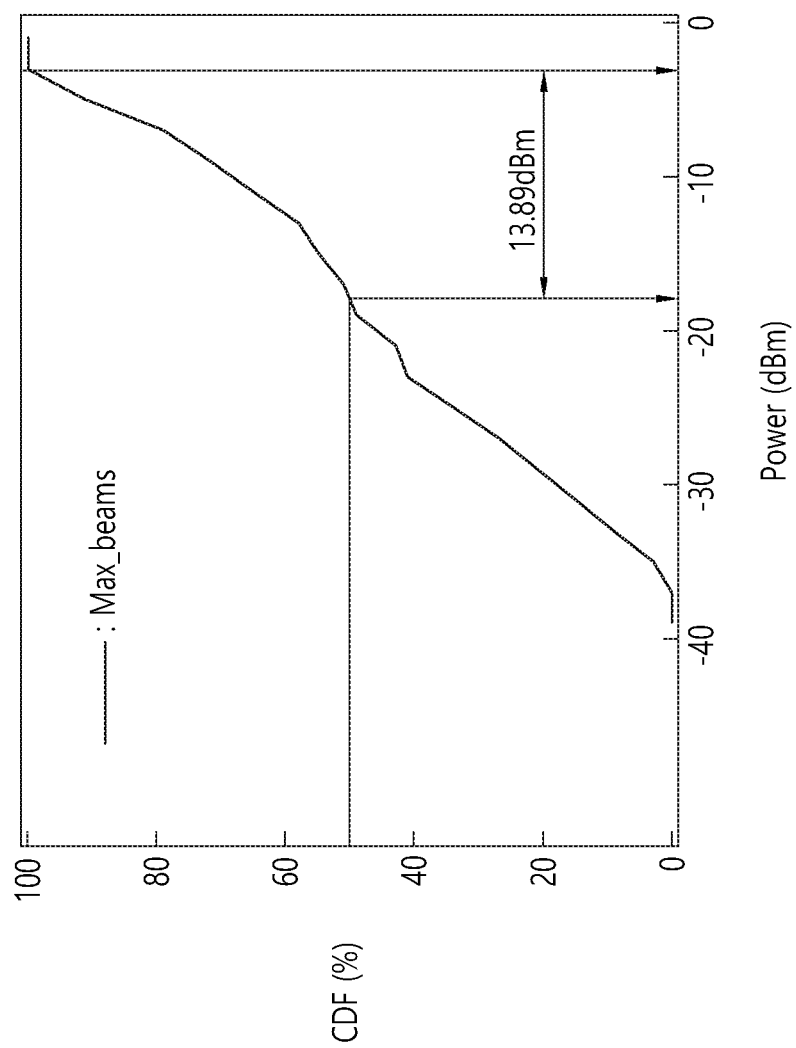

In FIG. 15D, Merged EIRP level 1501 is EIRP level determined by merging EIRP value of 11 beams (beams #0 to #7 and beams #128 to 130) in FIG. 15.

For determining the requirement of 50%-tile of EIRP value, offset value between peak EIRP level and the EIRP level of 50%-tile may be used.

Based on the merged EIRP level 1501 in FIG. 15D a required offset value between peak EIRP level and the EIRP level of 50%-tile (50$^{th}$ percentile) is derived equal to 13.9 dB.

Figure 16:
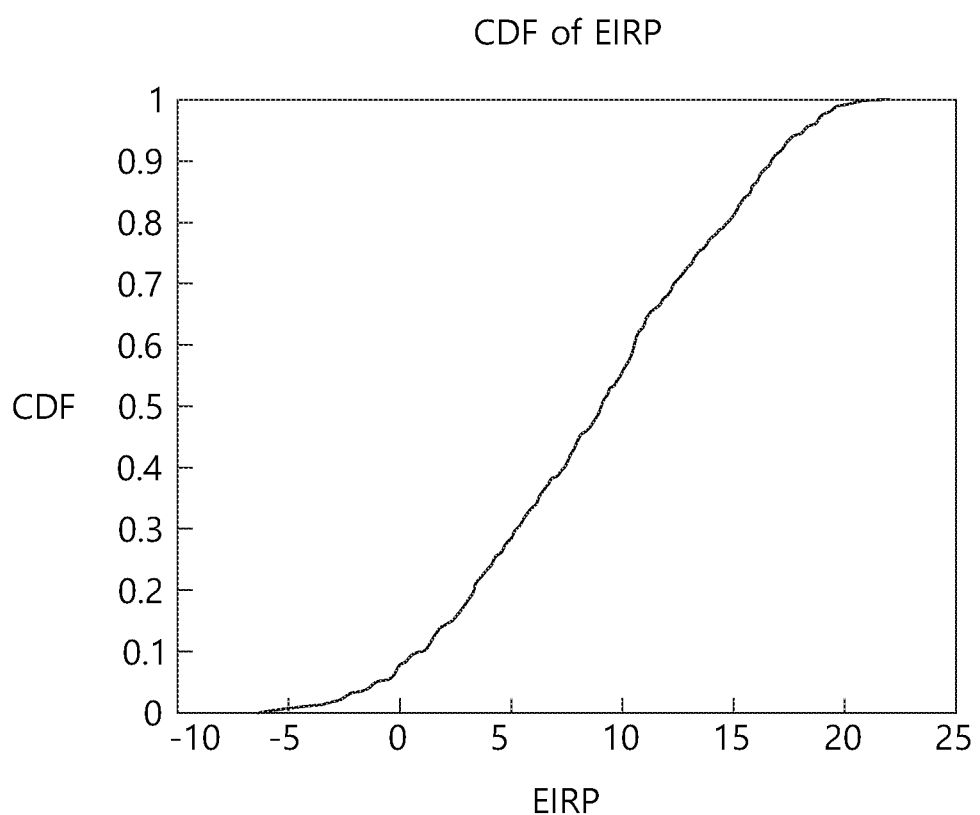
FIG. 16 illustrates a CDF of peak EIRP simulation results.

FIG. 16 illustrates a CDF of peak EIRP simulation results.

Based on CDF curve in CDF simulation of FIG. 16, the proposed offset value between peak EIRP and the EIRP level (21.5 dBm) of 50%-tile of EIRP level (9 dBm) is derived equal to 12.5 dB.

However, the measured EIRP results in FIG. 15 is not aligned the EIRP simulation results in FIG. 16. Based on FIG. 15 and FIG. 16, the measured merged EIRP level (13.9 dBm) is relaxed around 1.5 dB than simulated EIRP levels (12.5 dBm) in CDF curve.

Table 19 is a summary of the difference of required power level at 50%-tile according to simulation and measurement basis.

TABLE 19

|  | Simulation basis (FIG. 16) | Measurement basis (FIG. 15) |
|---|---|---|
| minimum peak EIRP | 22.4 dBm | 22.4 dBm |
| minimum spherical EIRP (50%-tile) | 22.4 − 12.5 = 9.9 dBm | 22.4 − 13.9 = 8.5 dBm |

Based on the measurement result of FIG. 15, it is proposed that 14 dB is considered for offset value between the minimum peak EIRP and minimum spherical EIRP (50%-tile) (that is, minimum EIRP at 50%-tile CDF).

Table 20 is an example of the requirement for spherical coverage based on the offset value 14 dB.

TABLE 20

|  | Required EIRP (at n257/n258) | Required EIRP (at n260) |
|---|---|---|
| minimum peak EIRP | 22.4 dBm | 20.6 dBm |
| minimum spherical EIRP (50%-tile) | 8.4 dBm | 6.6 dBm |

In table 20, minimum spherical EIRP (50%-tile) (that is, minimum EIRP at 50%-tile CDF) is determined by subtracting 14 dB from the minimum peak EIRP value. For example, minimum EIRP at 50% is 8.4 dBm is determined by subtracting 14 dB from 22.4 dBm at operating bands n257 or n258.

Thus, for the spherical coverage of power class at mmWave, RAN4 should specify the 50%-tile spherical coverage with 14 dB power offset from peak EIRP level.

Hereinafter, an apparatus to which the present invention can be applied will be described.

Figure 17:
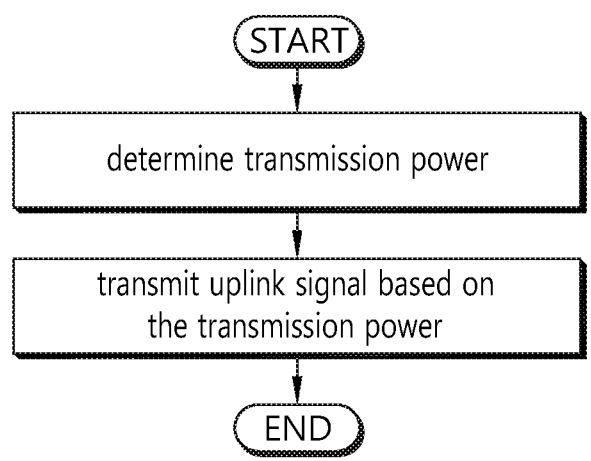
FIG. 17 illustrates an example of an operation of a wireless communication device according to embodiments of the present invention.

FIG. 17 illustrates an example of an operation of a wireless communication device according to embodiments of the present invention.

According to embodiments of the present invention, a wireless communication device (for example, a UE) determines transmission power. In detail, the UE determines transmission power for uplink signal based on a requirement for a minimum EIRP value for the spherical coverage. The UE determines the transmission power to meet the requirement for the minimum EIRP value for the spherical coverage. For example, the UE determines the transmission power to have an EIRP value which is bigger than or equal to the minimum EIRP value.

The requirement for the minimum EIRP value for the spherical coverage is predetermined based on a 50th percentile of a distribution of measured radiated power. Based on that the 50th percentile of the distribution of the measured radiated power is used, the spherical transmission EIRP power is determined to have a 50th percentile of the distribution of measured power (for example, measured radiated power) in whole sphere bigger than or equal to the predetermined minimum EIRP value (for example, minimum spherical EIRP of Table 20). For example, the requirement for the minimum EIRP value for the spherical coverage may be equal to 6.6 dBm for an operating band 260. The requirement for the minimum EIRP value for the spherical coverage may be equal to 8.4 dBm for an operating band 257 or 258 as shown in Table 20.

The requirement for the minimum EIRP value for the spherical coverage is predetermined based on a minimum peak EIRP value and an offset related to the 50th percentile of the distribution of measured radiated power. The requirement for the minimum EIRP value for the spherical coverage is predetermined based on subtracting the offset from the minimum peak EIRP value. The offset may be equal to 14 dB.

The UE transmit uplink signal based on the transmission power. In detail, the UE transmit uplink signal based on the transmission power, which meets the requirement for the minimum EIRP value.

The wireless communication device performs communication with at least one of a mobile terminal, a network and an autonomous vehicle, which is different from the wireless communication device.

Figure 18:
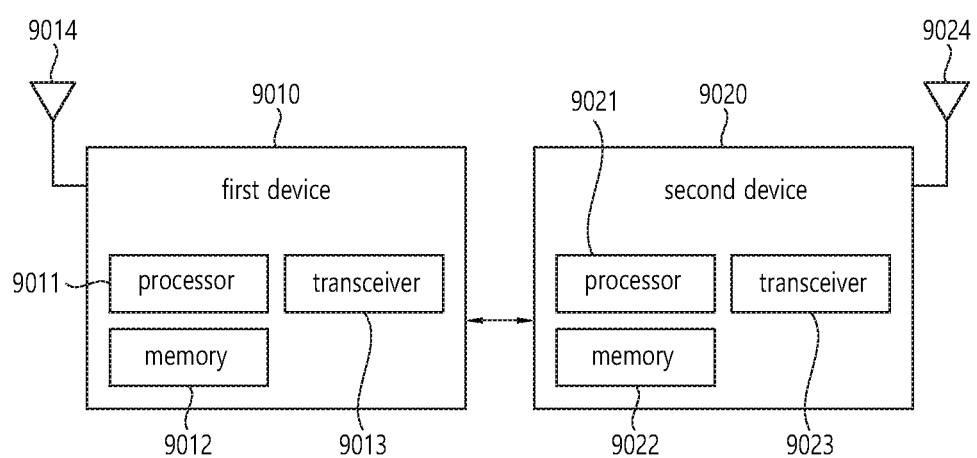
FIG. 18 illustrates a wireless communication device according to embodiments of the present invention.

FIG. 18 illustrates a wireless communication device according to embodiments of the present invention.

FIG. 18 illustrates a wireless communication device according to an embodiment of the present invention.

Referring to FIG. 18, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 9020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. The processor 9011 may perform one or more layers of a radio interface protocol. The memory 9012 may be connected to the processor 9011 and store various types of information and/or commands. The transceiver 9013 may be connected to the processor 9011 and controlled to transmit/receive a radio signal.

The second device 9020 may include at least one processor, such as a processor 9021, at least one memory, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal.

The memory 9012 and/or the memory 9022 may be each connected inside or outside the processor 9011 and/or the processor 9021 and connected to other processors through various techniques such as wired or wireless connection.

The first device 9010 and/or the second device 9020 may have one or more antennas. For example, an antenna 9014 and/or an antenna 9024 may be configured to transmit and receive the radio signal.

Figure 19:
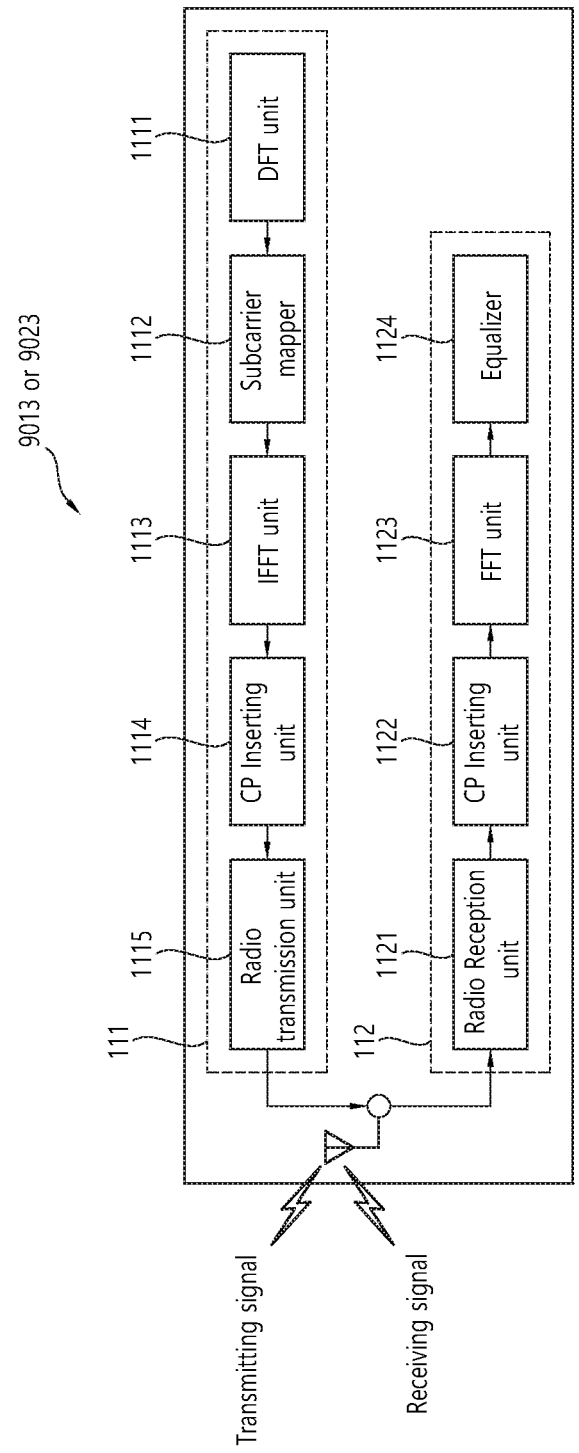
FIG. 19 is a detailed block diagram of a transceiver included in the wireless device shown in FIG. 18.

FIG. 19 is a detailed block diagram of a transceiver included in the wireless device shown in FIG. 18.

Referring to FIG. 19, the transceiver (9013 or 9023) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

Figure 20:
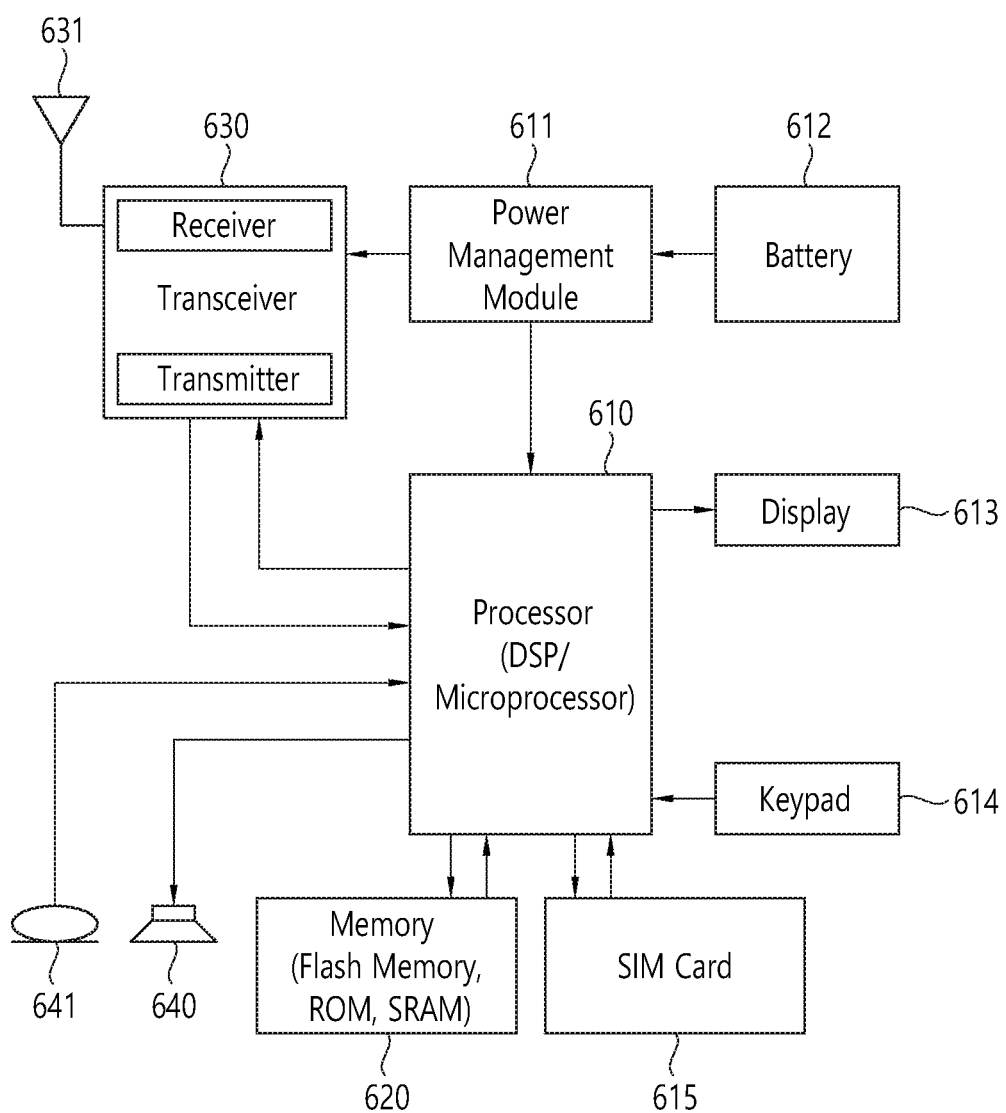
FIG. 20 illustrates a detailed example of the wireless communication device of FIG. 18.

FIG. 20 illustrates a detailed structure of the wireless communication device of FIG. 18.

FIG. 20 shows more detailed wireless communication device to implement an embodiment of the present invention. The present invention described above for UE side or network node side may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641. The processor 610 corresponds to the processor 9011 or the processor 9021. The memory 620 corresponds to the memory 9012 or the memory 9022. The transceiver 630 corresponds to the transceiver 9013 or the transceiver 9023.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to determine transmission power; and control the transceiver 630 to transmit uplink signal based on the transmission power, wherein the transmission power meets a requirement for a minimum Equivalent Isotropic Radiated Power (EIRP) value for the spherical coverage, and wherein the requirement for the minimum EIRP value for the spherical coverage is predetermined based on a 50th percentile of a distribution of measured radiated power.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiment of the present invention shown in FIG. 20, the spherical coverage is considered for the requirement for the EIRP value and the loss term, such as actual display (for example, LCD) and external cover of a UE, are reflected to the requirement.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for determining transmission power, the method performed by a wireless communication device and comprising:
    determining transmission power; and
    transmitting uplink signal based on the transmission power,
    wherein the transmission power meets a requirement for a minimum Equivalent Isotropic Radiated Power (EIRP) value for the spherical coverage, and
    wherein the requirement for the minimum EIRP value for the spherical coverage is predetermined based on a $50^{th}$ percentile of a distribution of measured power.

2. The method of claim 1,
    wherein the requirement for the minimum EIRP value for the spherical coverage is predetermined based on a minimum peak EIRP value and an offset related to the $50^{th}$ percentile of the distribution of measured power.

3. The method of claim 2,
    wherein the requirement for the minimum EIRP value for the spherical coverage is predetermined based on subtracting the offset from the minimum peak EIRP value.

4. The method of claim 1,
    wherein the requirement for the minimum EIRP value for the spherical coverage is equal to 6.6 dBm for an operating band 260.

5. The method of claim 1,
    wherein the requirement for the minimum EIRP value for the spherical coverage is equal to 8.4 dBm for an operating band 257 or 258.

6. The method of claim 2,
    wherein the offset is equal to 14 dB.

7. The method of claim 1,
    wherein the transmission power is determined to have a EIRP value which is bigger than or equal to the minimum EIRP value.

8. A wireless communication device for determining a transmission power, the wireless communication device comprising:
    a transceiver;
    a memory; and
    a processor operatively coupled to the transceiver and the memory, the processor is configured to:
        determine transmission power; and
        control the transceiver to transmit uplink signal based on the transmission power,
    wherein the transmission power meets a requirement for a minimum Equivalent Isotropic Radiated Power (EIRP) value for the spherical coverage, and
    wherein the requirement for the minimum EIRP value for the spherical coverage is predetermined based on a $50^{th}$ percentile of a distribution of measured power.

9. The wireless communication device of claim 8,
    wherein the requirement for the minimum EIRP value for the spherical coverage is predetermined based on a minimum peak EIRP value and an offset related to the $50^{th}$ percentile of the distribution of measured power.

10. The wireless communication device of claim 9,
    wherein the requirement for the minimum EIRP value for the spherical coverage is predetermined based on subtracting the offset from the minimum peak EIRP value.

11. The wireless communication device of claim 8,
    wherein the requirement for the minimum EIRP value for the spherical coverage is equal to 6.6 dBm for an operating band 260.

12. The wireless communication device of claim 8,
    wherein the requirement for the minimum EIRP value for the spherical coverage is equal to 8.4 dBm for an operating band 257 or 258.

13. The wireless communication device of claim 9,
    wherein the offset is equal to 14 dB.

14. The wireless communication device of claim 8,
    wherein the transmission power is determined to have a EIRP value which is bigger than or equal to the minimum EIRP value.

15. The wireless communication device of claim 8,
    wherein the wireless communication device performs communication with at least one of a mobile terminal, a network and an autonomous vehicle, which is different from the wireless communication device.

16. A processor for a wireless communication device in a wireless communication system,
    wherein the processor is configured to control the wireless device to:
        determine transmission power; and
        transmit uplink signal based on the transmission power,
    wherein the transmission power meets a requirement for a minimum Equivalent Isotropic Radiated Power (EIRP) value for the spherical coverage, and
    wherein the requirement for the minimum EIRP value for the spherical coverage is predetermined based on a $50^{th}$ percentile of a distribution of measured power.

* * * * *